United States Patent [19]

Backhouse

[11] Patent Number: 5,044,844
[45] Date of Patent: Sep. 3, 1991

[54] MACHINING APPARATUS

[75] Inventor: Anthony E. Backhouse, Kew, Australia

[73] Assignee: Furmanite Australia Pty. Ltd., Victoria, Australia

[21] Appl. No.: 620,167

[22] Filed: Nov. 30, 1990

[30] Foreign Application Priority Data

Nov. 30, 1989 [AU] Australia ............................ PJ7641
Oct. 4, 1990 [AU] Australia ............................ PK2633

[51] Int. Cl.$^5$ ............................................. B23C 1/20
[52] U.S. Cl. ................................. 409/178; 409/184; 409/193; 409/204
[58] Field of Search .................... 408/8, 13, 77, 79; 409/121, 123, 124, 125, 130, 175, 178, 179, 182, 199, 184, 186, 188, 204, 236, 193, 195

[56] References Cited

U.S. PATENT DOCUMENTS

| | | | |
|---|---|---|---|
| 3,145,622 | 8/1964 | Rust et al. | 409/178 |
| 3,563,116 | 2/1971 | Gurvich et al. | 409/178 |
| 3,603,204 | 9/1971 | Anderson, Jr. et al. | 409/179 |
| 3,687,007 | 8/1972 | Harris | 409/178 |
| 4,735,531 | 4/1988 | Boerckel et al. | 409/182 |

*Primary Examiner*—Daniel W. Howell
*Attorney, Agent, or Firm*—Sughrue, Mion, Zinn, Macpeak & Seas

[57] ABSTRACT

Machining apparatus comprises a boom rotatable about a pivot support within a cylindrical workpiece with a machining station, such as a milling cutter, mounted on the remote end of the boom. Two angularly spaced wheel units are provided on respective sides of the boom to support the boom on the workpiece. Each wheel unit has an actuator to raise or lower that side of the boom relative to the support surface. Variations in the level of the support surface are determined by sensors monitoring a reference such as a rigid template or a planar laser beam. Each actuator has a respective sensor for independently adjusting each wheel unit and each sensor may be on a radius from the pivot to the associated wheel unit.

In an alternative embodiment, the boom is linearly displaceable along spaced rails and the machining station is displaceable perpendicularly to the linear direction along the boom. The boom is mounted on the rails via three or more actuators, preferably four at respective corners of the boom, which are independently adjustable according to the sensed level to raise or lower the respective portion of the boom relative to the rails.

25 Claims, 7 Drawing Sheets

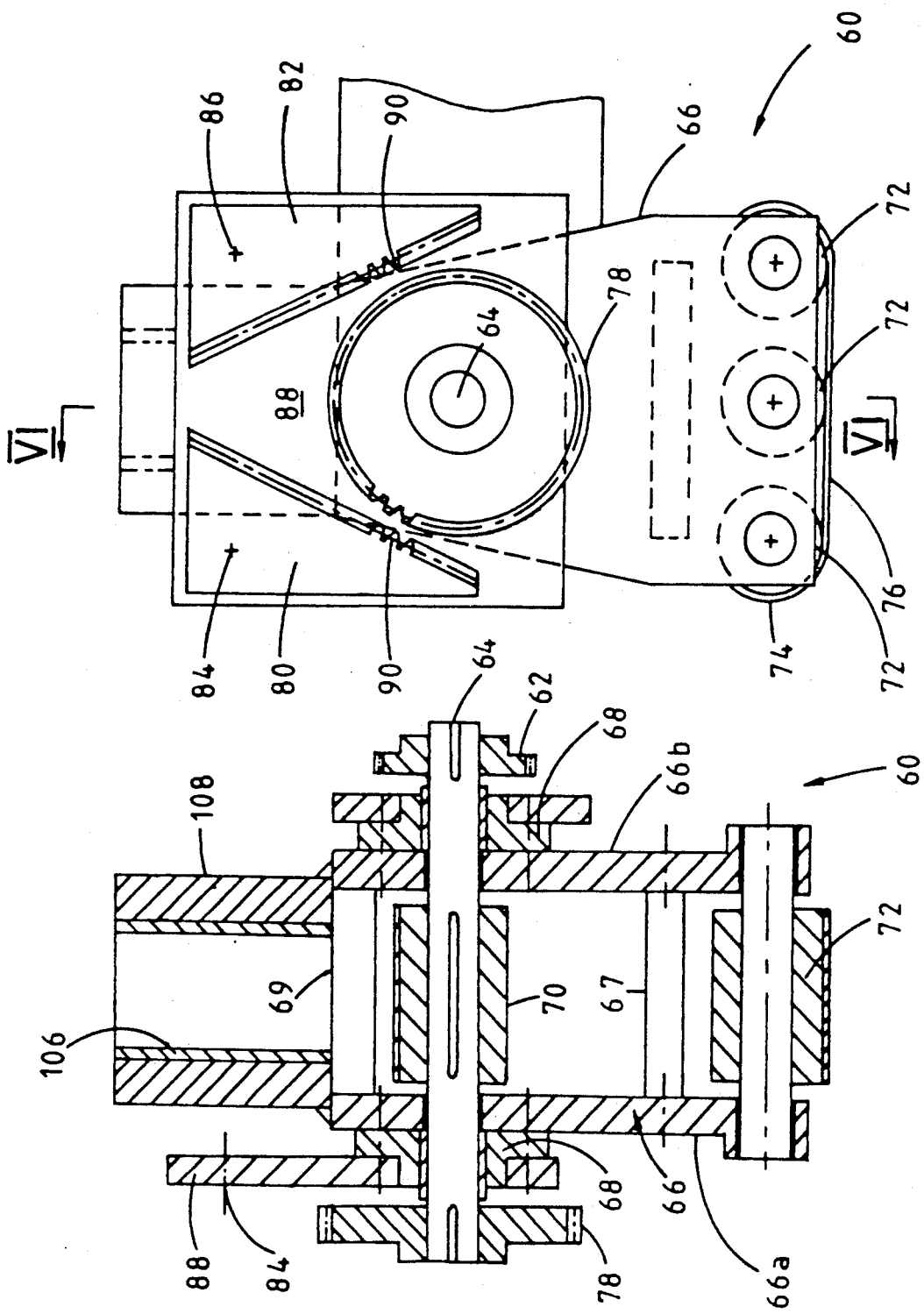

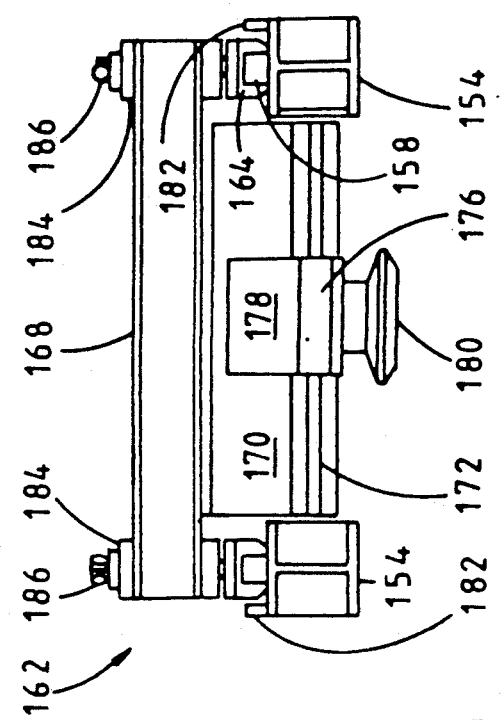
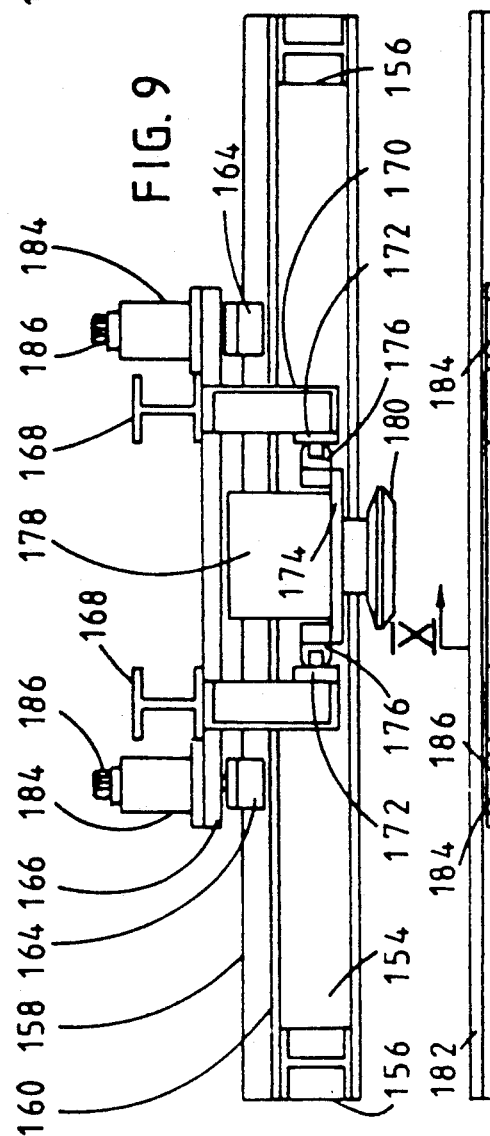
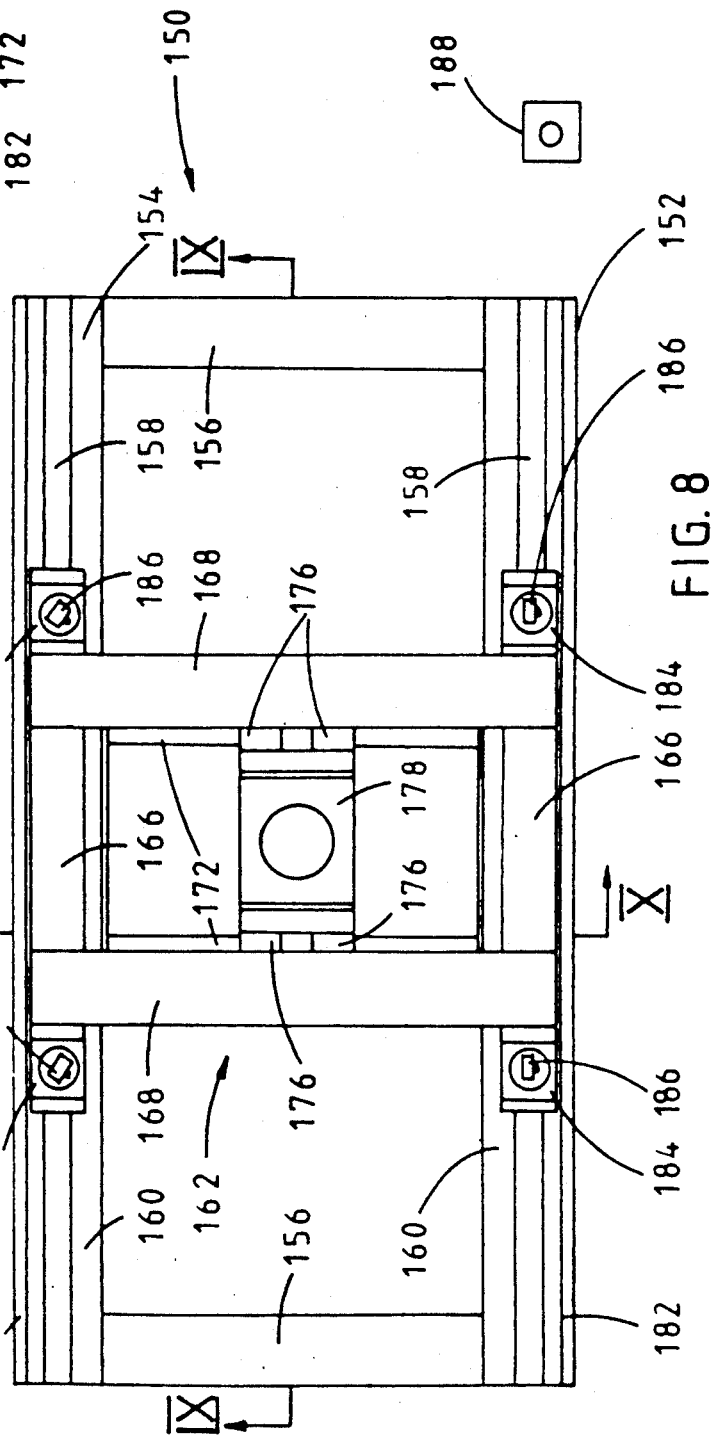

MACHINING APPARATUS

This invention relates to the field of large scale machining, especially of metal, and in particular it relates to apparatus for the precision machining of such circular workpieces as draglines, pressure vessels and slew ring mounting faces and of non-circular workpieces such as turbine housing edge flanges.

In the past it has been proposed to machine the edges of large circular workpieces such as draglines with a machine head mounted on the end of a pivoted boom. Rotation of the boom allows the machine head to machine the circular flange or end face of the dragline. Setting of the machine head relative to the surface to be machined has generally been achieved by guiding the free end of the boom along a precision clocked track adjacent the work surface. These arrangements have been inconvenient in that clocking of the track is difficult and time-consuming particularly as the work surface may be several meters in diameter. Similar considerations apply to the machining of workpieces using a machining head which is mounted for displacement along a boom which is itself displaceable perpendicularly to the machining head. It is vital that the rails or other structure on which the machining head and boom are respectively displaceable are level and this is a particularly difficult and time consuming task. The tolerances which have been achievable hitherto are not acceptable today for many machining operations.

One proposal for machining large circular workpieces is described in U.S. Pat. No. 3,145,622. In this proposal a centrally pivoted boom carrying the machining head is supported at its outer end on the workpiece end face to be machined. The support is by roller assemblies on respective sides of the machining head and the roller assemblies are height adjustable by means of hydraulically actuated valves to maintain a desired level of the machining head. The valves are controlled together by means of a single level sensor adjacent the machining head which is displaced along a template which is secured to the inner wall of the workpiece to be parallel to the machined end face of the workpiece. The single level sensor is intended to sense a change in level of each roller assembly and to counter it.

According to the present invention, there is provided apparatus for machining a workpiece, comprising a boom supported on a support structure, a machining station mounted on the boom, a plurality of spaced displacement means on the boom for enabling displacement of the boom relative to the support structure through engagement with one or more support surfaces, drive means to displace the boom along the support surface or surfaces, the displacement means being associated with respective portions of the boom and each being independently adjustable to allow the associated portion of the boom to move towards or away from the support surface, and wherein the independent adjustment of each displacement means is controlled by a respective sensor monitoring movement of the associated portion of the boom relative to a reference to counter inconsistencies in the support surface and thereby to maintain the machining station at a desired level.

In one embodiment in which the apparatus is for machining a circular workpiece, the boom is rotatable about a pivot support within the workpiece and the machining station, such as a milling head, is mounted on the boom remote from the pivot. Two angularly spaced displacement means are provided, each associated with a respective side of the boom. The support surface is conveniently, but not necessarily, the surface of the workpiece to be machined.

By this embodiment of the invention, the level of each side of the boom can be independently adjusted by the respective displacement means under the control of its sensor. Accordingly, if a surface variation in the support surface is experienced by one of the displacement means as the boom is rotated, the sensor controlling that displacement means can adjust the height of the associated side of the boom, thereby to maintain the boom and the machining station at the desired level relative to the workpiece. The adjustment of one of the displacement means may cause the sensor associated with the other displacement means to move out of the desired level so that that other displacement means will then require adjustment. However, the need for such follow-up adjustment is avoided if each of the sensors is monitoring the reference level on a radius between the pivot support means and the respective displacement means. Thus, the height of one of the displacement means can be adjusted without requiring adjustment of the other displacement means in this type of three point support for the boom.

In another embodiment, which may be used for circular workpieces but which is suitable also for linear, elongate, plate-like and other surfaces to be machined, the boom is supported on a support structure, such as a pair of rails, which usually extends on opposed sides of the workpiece and defines the support surfaces. The machining station, such as a milling head, is displaceable along the boom substantially perpendicularly to the displacement direction of the boom along the support structure. The boom could project beyond the support structure so that the machining head works on the workpiece to one side of the support structure. Three or more adjustable displacement means support the boom on the support structure, with at least one on each of the support surfaces. Preferably four adjustable displacement means are provided, two per support surface, at respective corners of the boom. However three adjustable displacement means may provide the same advantages of entirely independent adjustment that the aforementioned pivoted boom can provide.

The present invention facilitates machining the workpiece at the desired level without having to ensure that the support surface is absolutely parallel to the reference level, by providing the plurality of sensors each of which is associated with a respective portion of the boom supported by one of the displacement means, all of the displacement means being independently actuatable. The level to be machined is controlled by the reference, but it will be understood that the level of the machining station relative to the workpiece may desirably vary or be varied as the boom is displaced along the support surface(s) and that the term "the desired level" is therefore to be construed at any one time. Furthermore the term "level" should not be construed as implying that the machining head only machines in a horizontal plane but instead should be construed as relative to but not necessarily parallel with a plane defined by the reference.

The reference against which displacement of the boom is monitored may comprise a precise beam such as may be emitted by a laser source in a plane which intersects with each of the sensors in use. The beam is preferably very thin to be viewed by the sensors with fine tolerances. The source of the beam may be centred on the pivot support in the rotating boom embodiment or be offset to one side of the workpiece. The beam may spread over the desired plane but more conveniently a narrow beam continuously sweeps the desired plane at high speed to effectively give continuous sweeping of the reference plane. Each sensor may comprise a series of diodes.

Alternatively, the displacement of the boom may be mechanically monitored by the plurality of sensors each comprising a displacement transducer which engages a levelled template. The template reference is especially, but not only, suitable for use with the rotating boom embodiment in which case it may comprise a setting point such as a beam pivoting off the pivot support but independently of the boom. However a convenient template for the rotating boom embodiment comprises an annular reference surface extending around the pivot support to allow the displacement transducers to engage successive sectors of the template as the boom rotates. The load imposed on a template by a displacement transducer will normally be very low so that a relatively lightweight and potentially easily levellable template may be used. Such a template may comprise a precision laid annular track of the type which may be supported on the workpiece, but advantageously the template is a rigid machined ring which may be of considerably smaller diameter than the workpiece and be supported independently of the workpiece.

The rigid template may be integral with the pivot support or, more conveniently independently levellable, for instance with three supporting jacks. The level may be determined by a clocking arm or other suitable device such as a spirit level.

The displacement means to support the boom may comprise wheels or rollers to ride on the support surface(s), but other low friction means such as slides, including linear bearings, may be appropriate.

The machining station disposed on the boom may mount a metal milling cutter or other machining equipment such as a grinder, a borer, a buffer or a drill.

Two embodiments of apparatus in accordance with the invention will now be described by way of example only with reference to the accompanying drawings in which:

FIG. 5 is a front elevational view of a modified drive unit;

FIG. 6 is a sectional view taken on the line VI—VI of FIG. 5;

FIG. 8 is a plan view of the second embodiment of the invention;

FIG. 9 is a sectional elevation on line IX—IX of FIG. 8; and

FIG. 10 is a sectional elevation on line X—X of FIG. 8.

Figure 1:
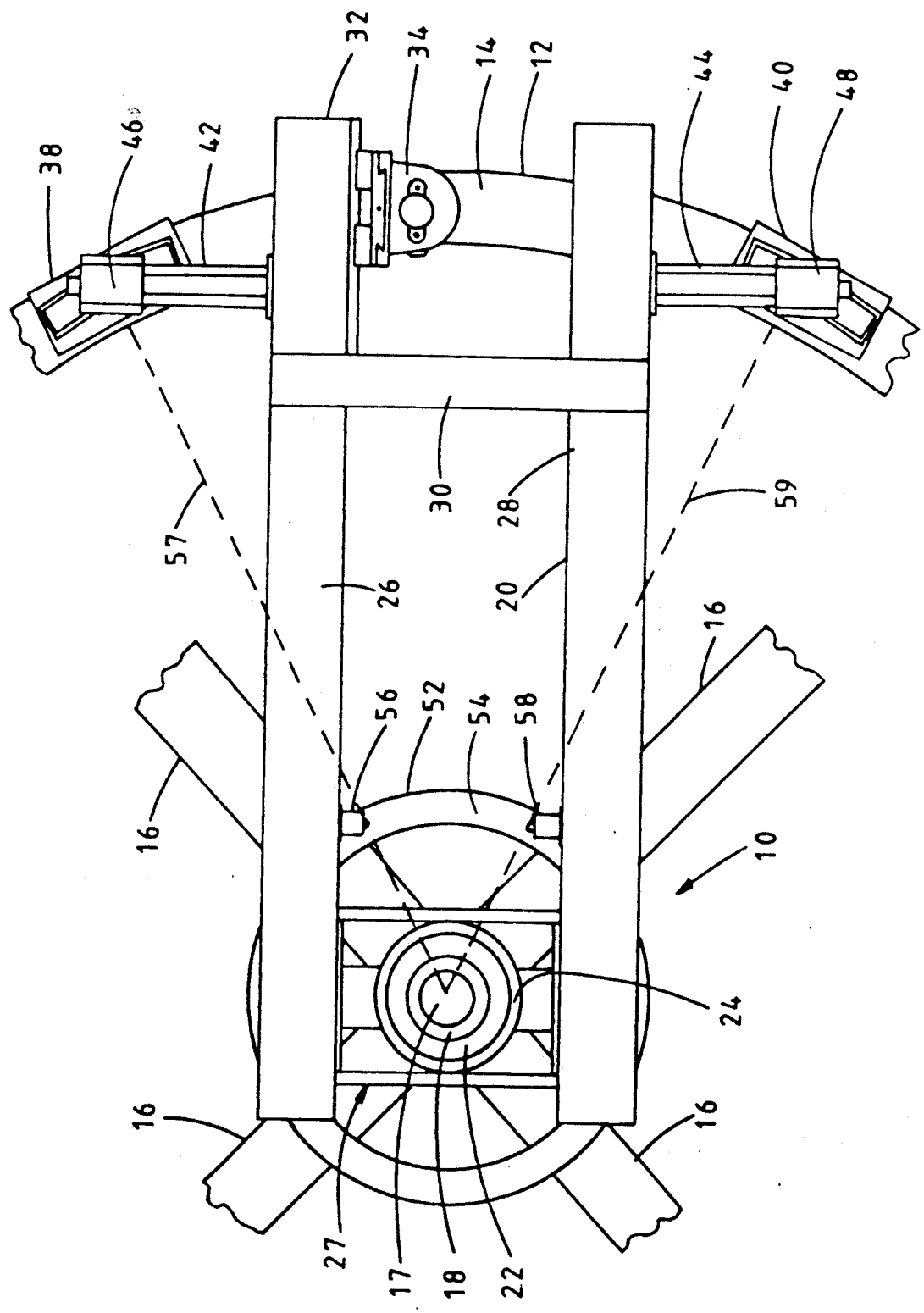
FIG. 1 is a schematic partial plan view of the first embodiment in use.
Figure 2:
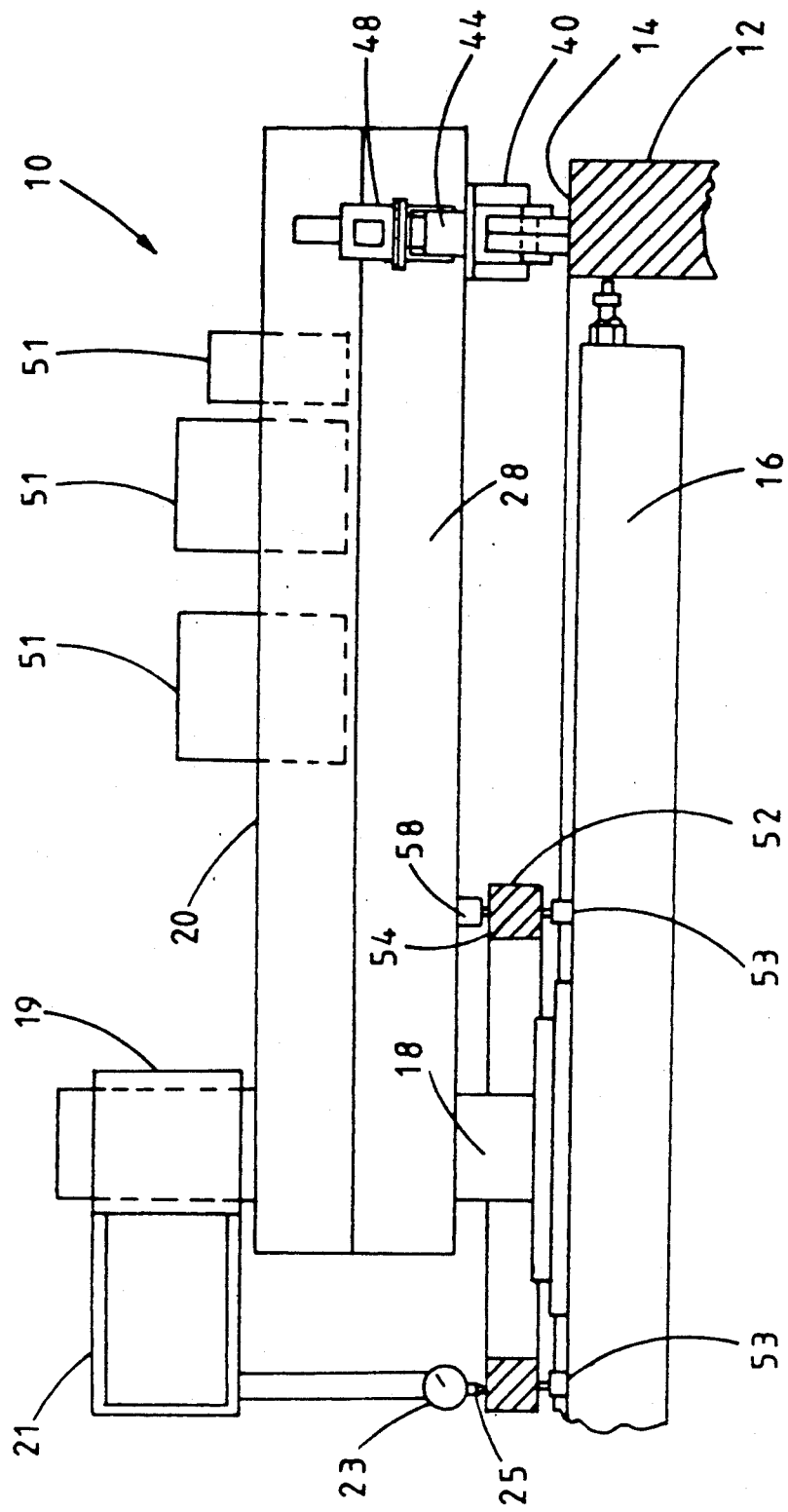
FIG. 2 is a schematic side view of the embodiment of FIG. 1.
Figure 3:
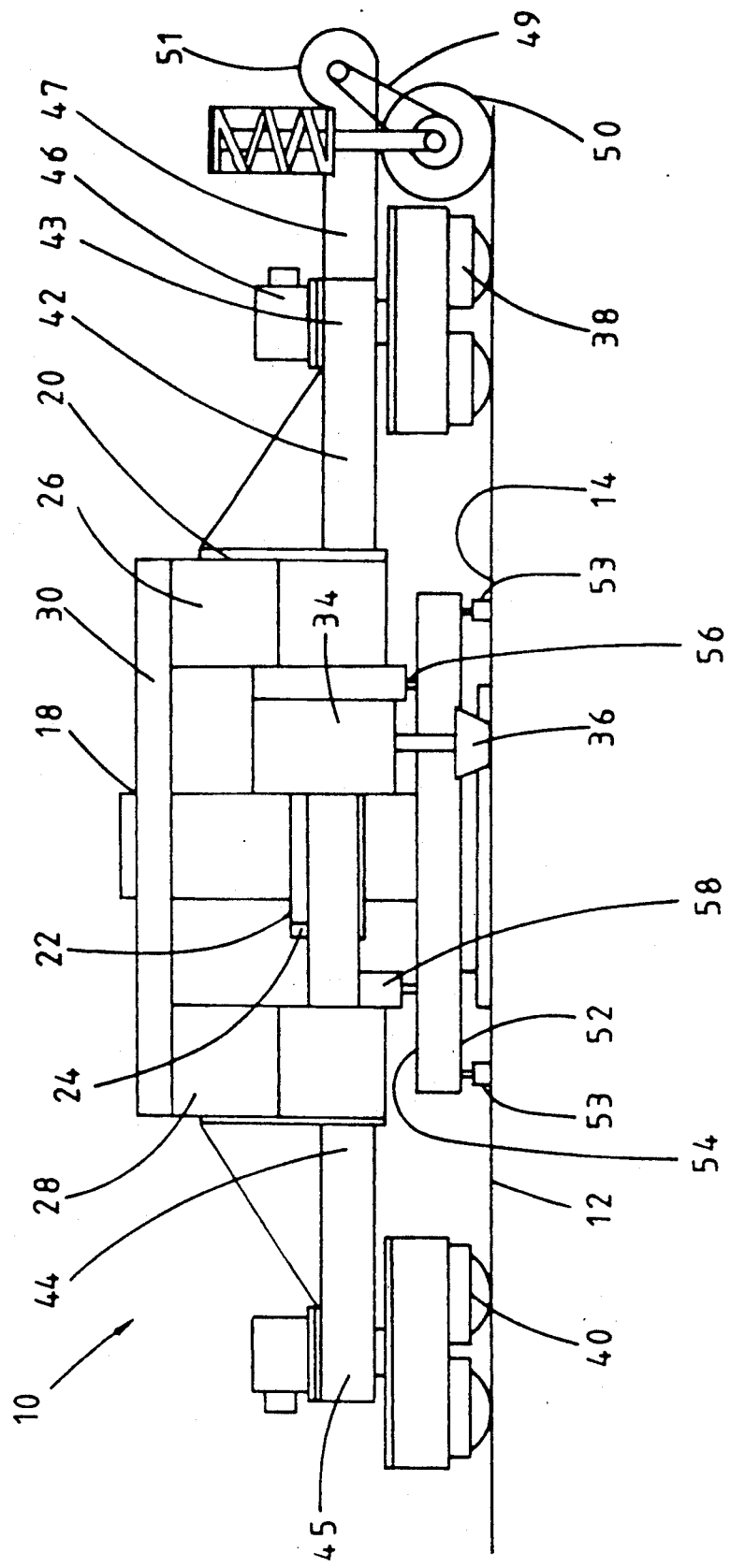
FIG. 3 is a schematic end view of the embodiment of FIG. 1.

Referring initially to FIGS. 1 to 3, the machining apparatus 10 is schematically shown in place within a circular workpiece 12 such as a 6 meter diameter slew ring having a top edge or flange defining a work surface 14 to be machined.

A spider of girders 16 extends across the interior of the workpiece 12 to locate a pivot support 18 of the apparatus 10 at the centre of the circular workpiece 12. The girders 16 may be welded at their radially outer ends of the inner wall of the workpiece, but as shown in FIG. 2 (one only) they are conveniently located by screw threaded studs which extend to rigidly engage the workpiece and which are adjustable to centralise the pivot support. The pivot support 18 is a vertically extending post which has a vertical aperture 17 therethrough to allow a plumb bob to be used to set the post relative to a datum. The pivot post is rigidly secured to the spider and setting the post vertical is achieved by jacking up the girders of the spider. In an alternative arrangement the pivot post could be adjustable relative to the spider or other rigid support for the pivot post.

The top of the pivot post carries a fixed radial bearing 19 to support a clocking arm 21 (for clarity shown only in FIG. 2) which will be discussed below. The top of the pivot post 18 may be further adapted to support a dumpy level or theodolite (not shown) to allow checking of the work surface 14 from the centre.

A boom 20 is pivotally mounted on the pivot post 18 via a self aligning tapered roller bearing 22 engaging a collar 24 of the boom. The bearing 22 permits a degree of twisting of the boom 20 relative to the support post 18. Other forms of self aligning bearing may also be appropriate.

A pair of arms 26 and 28 is rigidly secured to the collar 24 by a brace shown generally at 27 so that the arms extend from respective sides of the collar 24 parallel to each other in spaced apart manner. The arms 26 and 28 are also braced together along their length by one or more cross beams 30 (one only shown) to torsional rigidity.

At the distal end 32 of the boom, a hydraulic milling cutter machine 34 is located with its head 36 downwardly disposed to enable it to engage the work surface 14. The machine 34 is mounted on the boom 20 via a slide to enable the height of the machine 34 to be adjusted relative to the boom. The distal ends of the arms 26, 28 are supported by respective wheel units 38 and 40 riding on the work surface 14. The wheel units 38 and 40 are connected to their respective arms 26 and 28 by associated brackets 42 and 44 extending laterally outwardly of the arms. The boom 20 is thus supported at three points—the pivot post 18 and the two angularly spaced wheel units 38 and 40 disposed on opposite sides of the boom to form a triangular arrangement with the milling machine 34 disposed centrally of the wheel units.

The wheel units 38 and 40 are each mounted on the brackets 42 and 44 through respective hydraulic actuators 46 and 48 which are adapted to permit raising and lowering of the wheel units relative to the support arms 43 and 45 of the respective brackets, thereby enabling the level of the associated side of the boom to be raised and lowered relative to the level of the portion of the work surface 14 on which the respective wheel unit is riding at any one time. Each of the hydraulic actuators is independently actuatable, so that the actuators provide the ability to keep the boom at a desired level notwithstanding that the surface configuration of the work surface 14 upon which the wheel units 38 and 40 ride may vary with lumps, including weld beads, and depressions. A control mechanism for monitoring such irregularities in the height of the boom relative to the work surface and adjusting the actuators will be described below.

The wheel units 38 and 40 each have two pairs of aligned wheels within, the pairs being mounted in an angled arrangement such that the axis of each is on a respective radius from the pivot post 18. Having a plurality of wheels for each wheel unit assists in minimising marking of the work surface 14. It is preferred to have means for adjusting the height of the wheel units relative to the boom independently of the actuator position in order to provide an initial gross setting of an appropriate height for the boom. This additional adjustment can be achieved by having a series of holes at different heights in the wheel units and a pin to connect each wheel unit to its actuator through one of the holes. The pitch of the holes may be just under the stroke of the actuator. A stroke of 25 mm for the hydraulic actuators 46 and 48 has been found convenient for the desired accuracy of the system. Alternatively, or in addition to the series of holes, the brackets 42 and 44 may be bolted to respective arms 26 and 28 through elongate slots which enable vertical adjustment of the brackets relative to the arms.

A spring mounted electrically driven drive wheel 50 is mounted on a support arm 47 which extends rigidly from arm 26 of the boom to ride on the work surface 14 to displace the boom around the pivot post 18. This drive assembly has been omitted from FIGS. 1 and 2 for clarity only. The wheel 50 is rotated by means of a chain 49 driven by a reversible DC motor 51 and the spring mounting assists in maintaining the wheel 50 in contact with the surface 14.

As shown for convenience only in FIG. 2, the boom 20 supports housings 51 for the various hydraulics and control circuitry to operate the milling machine and other systems of the apparatus 10. The housings 51 are mounted between the arms 26 and 28 in order to lower the overall configuration of the apparatus. These housings have been omitted in FIGS. 1 and 3 to aid clarity.

A template 52, in the form of a rigid cylindrical ring, extends coaxially about the pivot post 18. The template has a precision ground upper surface 54 to a tolerance of 0.01 mm. The template is supported on three equally angularly spaced jacking screws, two only of which are shown schematically at 53. The jacking screws are shown supporting the template 52 from the spider of girders 16 but may equally well support the template from the machine base. The template defines the reference level relative to which the apparatus 10 machines and it is therefore vital that the upper surface is at the desired orientation, normally perpendicular to the axis of the pivot post 18. The clocking arm 21 is provided to assist this and is rotatable about the pivot post 18 with a gauge 23 having a sensing element 25 in contact with the surface 54 to determine deviation from the desired plane. The jacking screws 53 may be adjusted to correct deviations. The level of the clocking arm itself may be checked using a spirit level, or the spirit level may be used to check the level of the template, dispensing with the need for the clocking arm 21. The template may of course be inclined to the perpendicular to the pivot post axis and/or may define a non-planar reference surface if this is the configuration required for the machined work surface 14. If the template is not self-supporting a multitude of jacking screws should be used which hold the template and can be set according to the clocking arm to give the desired reference level.

In use, the correctly oriented template is sensed by a pair of displacement transducers 56 and 58 mounted on respective arms 26, 28 with the transducer elements directed downwardly into contact with the surface 54. Each of the transducers 56 and 58 is mounted in line with a radius from the pivot post 18 passing through the respective wheel unit, as shown by dashed lines 57, 59 in FIG. 1. The transducers may be mounted within respective split blocks (not shown) in passages which are slightly deeper than the sensing elements of the transducers such that before either transducer strokes out, the sensing element would become flush with the split block to allow the block to take any excessive loads. Each transducer is gripped by tightening a bolt through the associated split block. The split blocks may be mounted on magnetic bases for easy adjustment and protection against gross damage—as may occur if the boom 20 is dropped.

Figure 4:
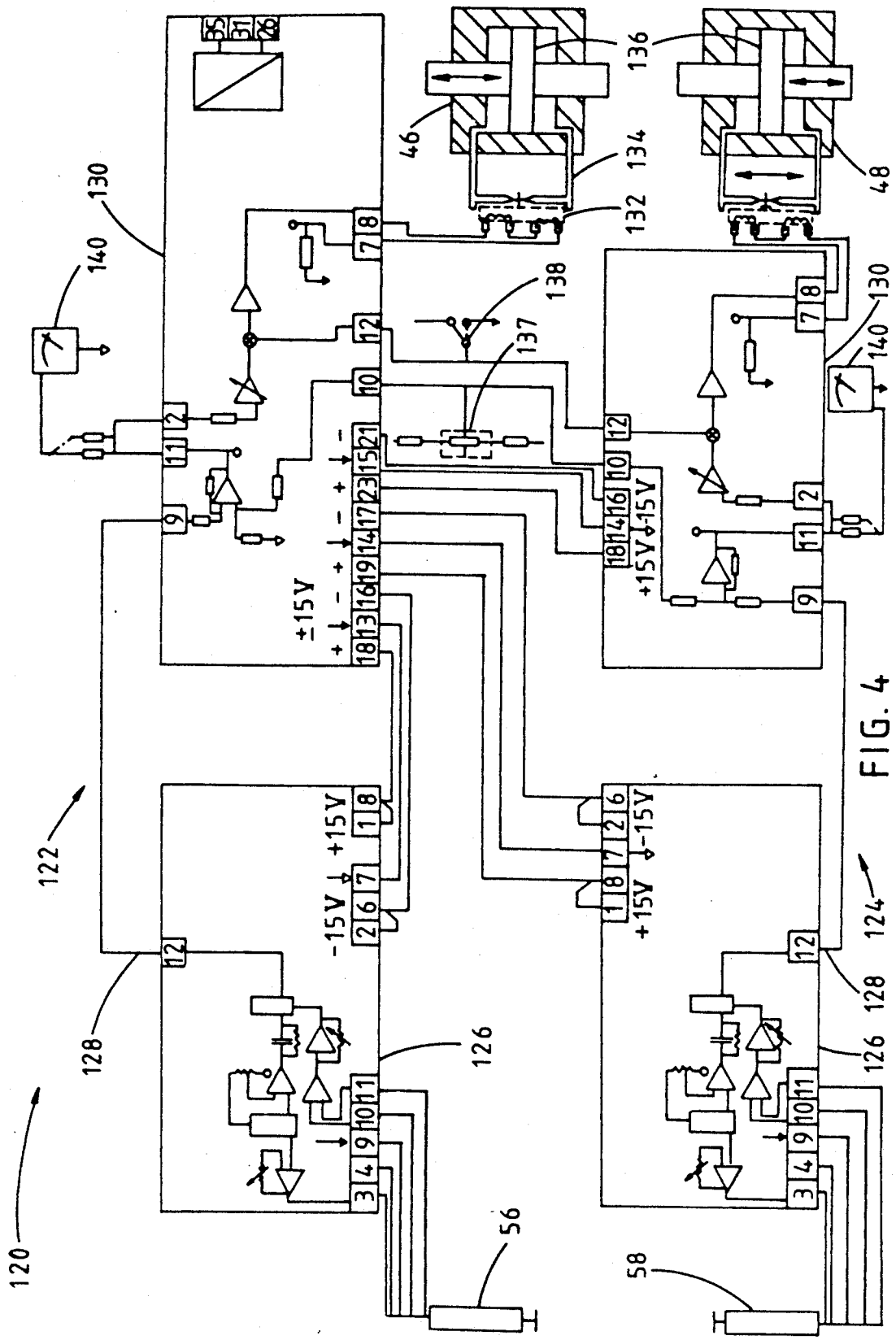
FIG. 4 is an electrohydraulic circuit for the embodiment of FIGS. 1 to 3.

The transducers each serve to monitor variation between the template surface 54 and the level of the respective side of the boom, i.e. the arm 26 or 28. If variation is detected, as would occur if a wheel unit rode up onto a bump on the work surface 14, the corresponding transducer 56 or 58 extends or retracts correspondingly and electrohydraulic circuitry, as depicted in FIG. 4, actuates the respective hydraulic actuator 46 to 48 to raise or lower the associated wheel unit 38 or 40 relative to its arm. The electrohydraulic circuitry of each transducer and associated actuator operates independently of the other, and as the transducers 56 and 58 are each in line with a radius extending from the pivot through the corresponding wheel unit, the adjustment of the height of one wheel unit does not affect the tracking of the other transducer on the template. Thus, with the above described three point support of the boom, height adjustment of one wheel unit twists the boom about an axis defined by the radius passing through the other wheel unit. Accordingly the adjustment of each wheel unit is independent of the other leading to very stable support of the milling apparatus. This stability is further assisted by the self aligning bearing 22 on the pivot post 18.

The use of electrohydraulic circuitry has been found to be capable of producing unexpectedly good control of the machining operation with successive passes of the milling head 36 being controlled to a tolerance of 0.01 mm which enables the use of a template 52 of comparatively small radius, e.g. 1 meter.

The electrohydraulic circuitry 120, as depicted in FIG. 4, continuously monitors the position of each transducer 56 and 58. It is desirable that the maximum height adjustment of each wheel unit 38 and 40 is maintained at a relatively low level, for example 25 mm to prevent paralysis of the circuitry and to enhance stability. Accordingly, when using the apparatus it will generally be advantageous to smooth off major bumps in the work surface 14 with an initial pass followed by successively lower passes as the work surface approaches smooth. Alternatively a filler such as body putty may be used to smooth off large lumps or holes thereby preventing too great a change of height between successive arcs of the work surface.

The electrohydraulic circuity 120 for the apparatus 10 comprises similar circuits 122 and 124 for each pair of hydraulic actuator/displacement transducer 46, 56 and 48, 58. Each of the circuits 122 and 124 comprises an exciter/demodulator 126 connected to the respective transducer and transmitting a signal via connector 128 to a servo amplifier 130 which actuates a servo valve 132 controlling the supply of hydraulic fluid 134 by a pump (not shown) to and from respective sides of a double-acting piston 136 in the associated actuator.

As indicated already, the circuits 122 and 124 are designed to function independently of each other but a potentiometer 137 is incorporated in the circuitry 120 which enables the zero position (normal position) of each displacement transducer 56 or 58 to be varied in relation to the other so that by adjusting the potentiometer in one direction, the zero position of one of the transducers is extended while the zero position of the other is retracted. This in effect tilts the boom 20 and machining station 36 and enables fine adjustment to be made. Thus, for example, it is possible to adjust a cutter to give a cross hatch on the work surface 14.

The control circuitry 120 has a start sequence built into it such that each arm 26 and 28 of the boom 20 is set up on a screw jack (not shown) to the desired position. The displacement transducers 56 and 58 are then set on the template 52 with the hydraulic control pump running and a raise/auto switch 138 in the raise position. The jacks are then adjusted to allow the arms 26 and 28 to lower. The movement is indicated on respective voltmeters 140 which act as error gauges and accurately show the error in distance that the associated displacement transducer is from its zero output point. The raise/auto switch 138 is then moved to the auto position. The machine 10 then automatically adjusts itself, moving the actuators 46 and 48 and wheel units 38 and 40 to raise the boom 20 until the transducers 56 and 58 are displaced to give zero error on the voltmeters 140. The screwed jacks can then be wound up as desired.

The electrohydraulic circuitry 120 may be rendered safe from power failure by incorporating a small hydraulic storage and sufficient electrical capacity to allow the machine to hold its level until the milling head 38 stops. The control circuit power may come from a sub switch on a pump driving the milling head.

While the apparatus 10 has been described by reference to a planar template surface 54 generally perpendicular to the axis of rotation of the boom 20 defined by the support post 18, it will be readily apparent that the reference need not define such a planar or non-planar surface for the work piece i.e. a wave form or inclined surface may be machined by the setting of an appropriate template or other reference. A suitable alternative planar reference may be a laser beam as is described hereinafter with reference to the embodiment of FIGS. 8 to 10. It will be understood that such a laser beam arrangement may replace the template 52 with appropriate electro optical sensors. Alternatively, an arm pivoting off the support post 18 but independent of the boom 20 could provide the reference. Alternatively again, an electronic level associated with each actuator could be used as the reference.

Electrohydraulic circuitry 120 has been described for adjusting the wheel units but alternatively, control of the adjustment of the wheel units may be all electric, for instance via a DC stepping motor.

Furthermore the machining head 38 of the apparatus 10 could be oriented upwards to machine the underside of a circular workpiece. Alternatively the machining head could be arranged to machine the interior wall of a circular work piece. The apparatus could be arranged to pivot about a non-vertical axis, for example horizontal or inclined, and the description of apparatus 10 should be construed accordingly.

In a further embodiment the apparatus 10 may be used as the basis of a portable or permanent floor mounted machine where the wheel units ride on a track rather than the work surface. The support post 18 and template 52 would be mounted in the centre of the track. If desired, the machine could then dress the track to true level but this should be unnecessary. Large bulky objects to be machine could then be placed on stands over the machine. The stands would be set outside the swing of the machine which may be adjustable. Attachments to the machine could allow different machining functions such as milling, boring, spigot cutting and drilling. A bracket could be mounted on the boom to carry the machining station so that it would be possible to machine elevated faces of the workpiece. Angles could be set using a theodolite mounted on the support post 18.

Referring now to FIGS. 5 and 6, a drive unit 60 is shown to replace the drive wheel 50 shown in FIG. 3. The drive unit 60 is also indirectly driven by means such as the reversible DC motor 51 with the chain 49 (see FIG. 3) engaging a sprocket 62 mounted on a drive axle 64 of the drive unit. The drive axle 64 is mounted for rotation in and relative to a box frame 66 of the drive unit by means of opposed self aligning bearings 68. A drive pulley 70 is mounted on and for rotation with the drive axle 64 within the box frame 66. The box frame 66 comprises a pair of spaced plates 66a and 66b through which the drive axle 66 passes and a cross member 67 and top plate 69 bridging the spaced plates.

A series of three idler pulleys 72 are also mounted for rotation in and relative to the box frame 66 about spaced axes parallel to the drive axle 64. The idler pulleys 72 project below the level of the box frame 66 and a flexible drive belt 74 extends about the idler pulleys 72 and the drive pulley 70. A lower run 76 of the belt 74 extending between the idler pulleys 72 is flat and defines a drive surface for engagement with the work surface 14 (see FIG. 3). As may be seen by comparing FIGS. 5 and 6, the drive belt 74 is relatively narrow compared to the length of the lower run 76, which tends to reduce squirming.

The belt 74 is positively driven through the described arrangement by, for example, the DC motor 51, but under some conditions the action of the cutting or other tool 36 or the shape of the work surface 14 may tend to cause the boom 20 and therefore the drive unit 60 to travel backwards against the drive resulting in undesirable reversal of the drive belt and drive pulley 70 against the motor. In order to resist this, a non reversing mechanism is incorporated in the drive unit 60.

The non-reversing mechanism comprises a gear 78 mounted at the opposite end of the drive axle 64 to the sprocket 62 for rotation therewith and a pair of ratchet arms 80 and 82 (omitted from FIG. 6 for clarity) which are pivoted about respective axes 84 and 86 from a support plate 88 which is fixed relative to the box frame 66. Each ratchet arm 80, 82 incorporates a rack 90 to suit the gear 78. The ratchet arms 80 and 82 are pivotally mounted from the support plate 88 so as to be manually engagable with and disengagable from the gear 78. Each ratchet arm may be balanced or, for example, spring biased with an over centre action so as to remain in or out of engagement with the gear 78.

Referring firstly to the ratchet arm 80, if this is pivoted into engagement with the gear 78, it will permit rotation of the gear, and therefore of the drive axle 64, the drive pulley 70, the idler pulleys 72 and the drive belt 74, in the anti-clockwise direction (see FIG. 5). If the boom 20, and therefore the drive belt 74, is caused to reverse its direction without positively reversing the drive motor 51, the ratchet arm 80 will be automatically engaged with the gear 78 to resist such reversal. While it is desired to provide anti-clockwise displacement of the belt 74 (in FIG. 5) the ratchet arm 82 is maintained out of engagement with the gear 78. Likewise, if it is desired to provide clockwise displacement of the drive belt through the drive motor 51, the ratchet arm 82 is moved into engagement with the gear 78 and the ratchet arm 80 is moved out of engagement with the gear 78 to resist undesirable anti-clockwise driving forces.

Figure 7:
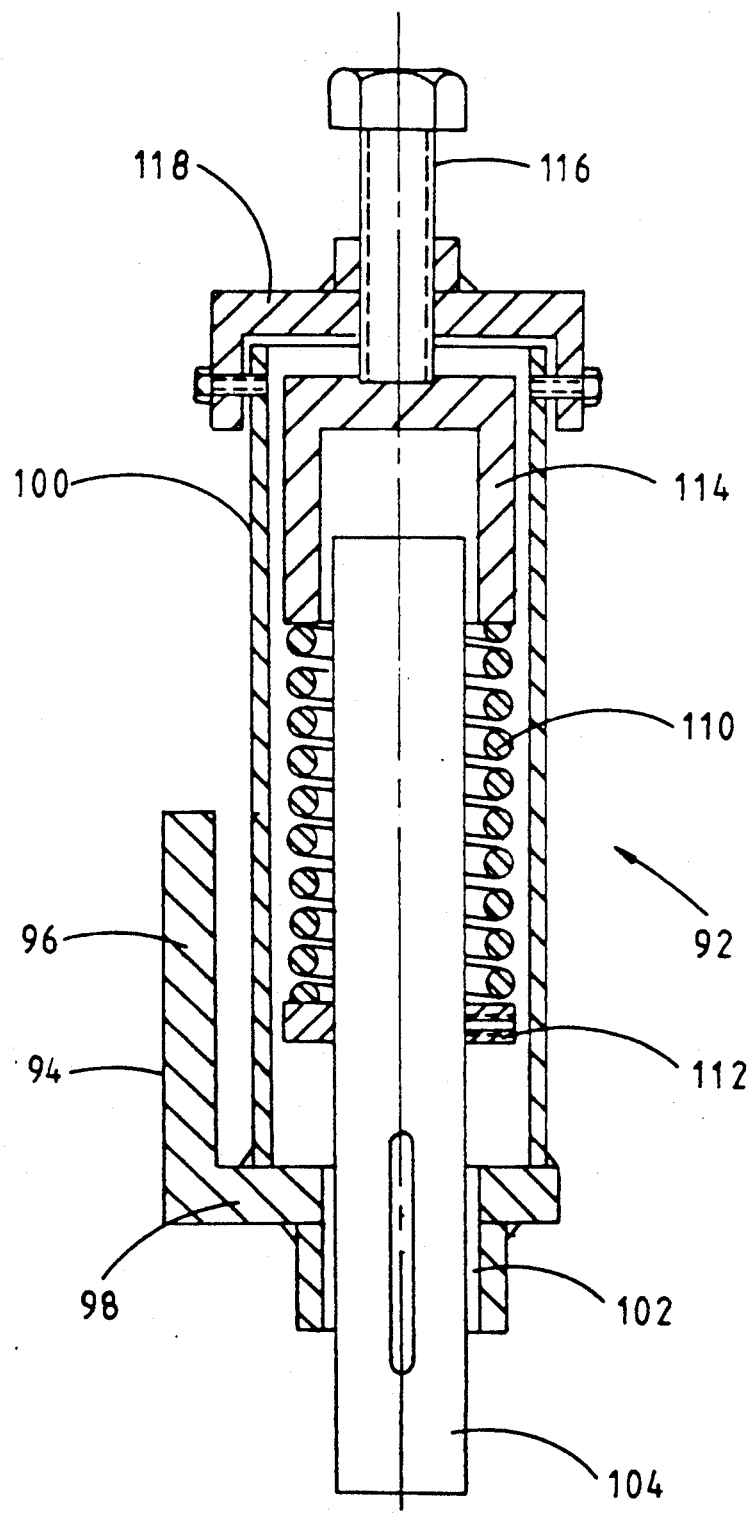
FIG. 7 is a sectional view of a spring-loaded mount for the drive unit of FIGS. 5 and 6.

The drive unit 60 is mounted on the boom 20 by means of a spring loaded support 92 shown in FIG. 7. The support 92 comprises an L-shaped bracket 94, an upright leg 96 of which is secured to the boom 20 and a lower leg 98 of which supports a tubular housing 100. The lower leg 98 of the bracket 94 carries a bush 102 in which is slidably received a support rod 104 which projects from the housing 100 coaxially therewith. The projecting portion of the support rod 104 is received in a corresponding bush 106 carried by a mount 108 on the top plate 69 of the box frame 66 of the drive unit 60. The support rod 104 is biased outwardly from the housing by a helical spring 110 to maintain the lower run 76 of the belt 74 in engagement with the work surface 14. One end of the spring 110 engages a stop 112 on the rod 104 while the other end engages a yoke 114 supported by a bolt 116 screw-threadedly engaged with a cap 118 of the tubular housing 100. Adjustment of the bolt 116 is used to increase or decrease the compression of spring 110 under load.

Referring now to FIGS. 8 to 10, the apparatus 150 is capable of machining any workpiece (not shown) within a frame 152 defined by parallel spaced side beams 154 and parallel end beams 156 which extend between the adjacent ends of the side beams 154. The end beams 156 positively locate the side beams but may be omitted if the side beams are suitably secured by appropriate other means.

The side beams 154 comprise reinforced I-beams and each carries a respective rail 158 on an upper flange 160 thereof. The rails 158, which are rigidly secured to the side beams 154, extend parallel to each other and carry a boom 162 displaceably thereon. The boom 162 is displaceably carried on the rails 158 by four linear bearings 164 at respective corners of the boom which closely envelop the rails 158 as clearly shown in FIG. 10 to positively locate the boom against lateral displacement relative to the rails. The linear bearings 164 may be replaced by other low friction displacement units such as wheel or roller assemblies, but it is believed that they provide the optimum positive location of the boom.

Each pair of linear bearings 164 per rail 158 is mounted on the respective ends of one of two longitudinal floating beams 166 of the boom, which two beams 166 are bridged by longitudinally spaced I-beams 168 which define parallel arms of the boom 162 extending perpendicularly to the rails 158 and to the floating beams 166 to which they are welded.

Each arm 168 of the boom has a box girder 170 welded or bolted to a lower face thereof which depends rigidly therefrom between the side beams 154 of the machine frame 152. The box girders 170 extend parallel to each other, and bolted to a front face of each is a respective laterally extending linear rail 172. The linear rails 172 carry a machining carriage 174 by means of opposed linear bearings 176 engaging the rails 172. The machining carriage 174 carries a machining station 178 with a depending head 180 such as a milling head. Alternatively, the head 180 can project upwardly from the station 178 to machine an overhead workpiece.

The machining head 180 can machine a workpiece disposed within the frame 152, such as the edge faces of part of a turbine housing secured on a base and the machining head can be displaced to overlie any zone within the frame by displacement of the boom 162 along the rails 158 and/or by displacement of the machining carriage 174 along the perpendicularly extending linear rails 172. Displacement of the boom along the rails 158 may be by means of opposed motors (not shown) mounted on the floating beams driving spring biased pinions (not shown) engaged with respective racks 182 extending parallel to the rails 158. The drive arrangement may be much as described with reference to FIG. 3 except that the wheel or roller 50 is replaced by a pinion and that at least two are provided, one for each rack 182. A similar arrangement may be provided for the machining carriage 174, or the carriage 174 may be displaced by an electric motor/chain drive unit (not shown) associated with each lateral rail 172.

In order for the machining head 180 to machine accurately, it is important that both the boom 162 and the machining carriage 174 are maintained level (or in the desired plane) as they are displaced along their respective rails. Ensuring that the machining carriage 174 remains level as it is displaced along the linear rails 172 is a relatively straight forward matter since the rails 172 are bolted to a vertical face of the respective box girders 170 and adjustment of the rails may be performed by loosening the securing bolts (now shown), adjusting the rails until they are determined to be level, for example by means of a spirit level, and retightening the bolts. However, the longitudinal rails 158 are mounted on the upper face of the flange 160 of the side beams 154, and ensuring that they are level is very much more difficult, particularly as the frame 152 may need to be built up to a satisfactory height. In order to resolve this difficulty, each of the linear bearings 164 engaging the rails 158 is independently vertically displaceably carried by a respective hydraulic actuator 184 mounted on the associated end of the floating beams 166. The hydraulic actuators and the electrohydraulic control circuitry for each actuator are substantially the same as described with reference to FIG. 4 (four circuits being provided in this embodiment), and will therefore not be described further, except for the sensors 186 for determining the desired level or plane. The sensors 186 could read off piano wires or other mechanical level—defining means such as an overhead template, but as shown in FIG. 8, the sensors 186 are adapted to read off a planar laser beam generated by a laser source device 188 located adjacent one corner of the frame 152. A suitable laser source device is available from Monochromatic Engineering of Melbourne, Victoria which generates a beam of narrow diameter in the desired plane. The beam continuously sweeps the sensing zone above the frame 152 to effectively give continuous sensing of the reference level. The sensors read the beam to ensure fine accuracy in establishing the level. Each sensor 186 comprises an array of overlapping diodes capable of "seeing" the laser beam and of generating an electrical signal in response. The array of diodes is elongate and inclined slightly relative to the reference plane with a central diode arranged to give a zero response. With increasing distance from the central diode, both above and below, the diodes will give an increasing response to indicate the increased deviation from the norm. End diodes may be arranged to broaden the range of the sensors.

The response signal from each diode array actuates the electrohydraulic circuitry of the sensor/actuator to extend or retract the associated linear bearing 164, thereby raising or lowering that corner of the boom 162 to take account of inconsistencies in the level of the rails 158.

Many of the features and options described with reference to the apparatus 10 are applicable to the apparatus 150, with appropriate modifications which will be clear to those skilled in the art, and the description of the apparatus 150 should be read accordingly.

Those skilled in the art will appreciate that the invention described herein is susceptible to variations and modifications other than those specifically described. It is to be understood that the invention includes all such variations and modifications which fall within its spirit and scope.

I claim:

1. Apparatus for machining a workpiece, comprising a boom supported on a support structure, a machining station mounted on the boom, a plurality of spaced displacement means on the boom for enabling displacement of the boom relative to the support structure through engagement with one or more support surfaces, drive means to displace the boom along the support surface or surfaces, the displacement means being associated with respective portions of the boom and each being independently adjustable to allow the associated portion of the boom to move towards or away from the support surface, and wherein the independent adjustment of each displacement means is controlled by a respective sensor monitoring movement of the associated portion of the boom relative to a reference to counter inconsistencies in the support surface and thereby to maintain the machining station at a desired level.

2. Apparatus according to claim 1 wherein the support structure comprises a pivot about which the boom is rotatable, the machining station being mounted on the boom remote from the pivot and two angularly spaced displacement means being provided, each associated with a respective side of the boom.

3. Apparatus according to claim 2 wherein the sensors are disposed on respective radii extending between the pivot and the associated displacement means.

4. Apparatus according to claim 2 wherein the machining station is equally angularly disposed between the two displacement means.

5. Apparatus according to claim 2 wherein the boom is supported on the pivot by means of a self-aligning bearing.

6. Apparatus according to claim 2 wherein the displacement means comprise wheels or rollers whose axes of rotation extend along a radius from the boom pivot.

7. Apparatus according to claim 2 wherein the displacement means associated with each side of the boom comprises two angularly spaced pairs of two wheels.

8. Apparatus according to claim 2 wherein means is provided to resist unintentional reversing of the direction of displacement of the boom along the support surface.

9. Apparatus according to claim 8 wherein the reversal resisting means comprises a ratchet assembly.

10. Apparatus according to claim 2 wherein the drive means comprises a driven belt having a run which is adapted to contact the support surface, said run having a greater length than width.

11. Apparatus according to claim 2 wherein the reference comprises an annular template extending about the pivot in the form of a rigid ring and the sensors comprise displacement transducers adapted to engage a reference surface of the ring.

12. Apparatus according to claim 11 wherein the template is rigidly supported by the pivot.

13. Apparatus according to claim 11 wherein the template is supported by an independent jacking assembly.

14. Apparatus according to claim 11 wherein the template has a substantially smaller radius than the spacing of the machining station from the pivot.

15. Apparatus according to claim 11 wherein a clocking arm is rotatably supported on the pivot for facilitating the levelling of the reference surface of the template.

16. Apparatus according to claim 1 wherein the boom is supported for displacement along two spaced support surfaces defining the support structure and the machining station is displaceable along the boom substantially perpendicularly to the displacement direction of the boom, and wherein three or more adjustable displacement means support the boom on the support structure with at least one in engagement with each of the support surfaces.

17. Apparatus according to claim 16 wherein four adjustable displacement means are provided at respective corners of the boom for engagement of a respective two with each support surface.

18. Apparatus according to claim 16 wherein the machining station is supported for displacement along opposed vertical faces of the boom and wherein the level of the machining station relative to the boom is selectively manually adjustable.

19. Apparatus according to claim 16 wherein the machining station is supported for displacement along the boom by linear bearings.

20. Apparatus according to claim 16 wherein the adjustable displacement means comprise linear bearings.

21. Apparatus according to claim 16 wherein the reference is defined by mechanical levelling means and the sensors comprise displacement transducers.

22. Apparatus according to claim 1 wherein each sensor comprises an electronic level.

23. Apparatus according to claim 1 wherein the reference comprises a precise beam of energy emitted in a plane and the sensors determine movement of same relative to the plane of the beam.

24. Apparatus according to claim 23 wherein the beam is adapted to be emitted by a laser source.

25. Apparatus according to claim 1 wherein electrical circuitry for controlling the adjustment of the displacement means according to movement monitored by the sensors comprises potentiometer means for selectively adjusting one of the displacement means relative to the other displacement means to tilt the machining station.

* * * * *